(12) United States Patent
Sieber et al.

(10) Patent No.: US 12,073,072 B2
(45) Date of Patent: Aug. 27, 2024

(54) OPERATING INTERFACE OF A MOTOR VEHICLE HAVING A DISPLAY AND AN ACTUATOR AND MOTOR VEHICLE

(71) Applicant: Dr. Ing. h.c. F. Porsche Aktiengesellschaft, Stuttgart (DE)

(72) Inventors: Volker Sieber, Karlsbad (DE); Dominik Klaiber, Leonberg (DE); Fabian Schmid, Grafenau (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 18/139,467

(22) Filed: Apr. 26, 2023

(65) Prior Publication Data

US 2023/0350562 A1   Nov. 2, 2023

(30) Foreign Application Priority Data

Apr. 26, 2022 (DE) ...................... 10 2022 109 971.7

(51) Int. Cl.
*G06F 3/0487* (2013.01)
*G06F 3/02* (2006.01)
*B60K 35/10* (2024.01)

(52) U.S. Cl.
CPC .......... *G06F 3/0487* (2013.01); *G06F 3/0202* (2013.01); *B60K 35/10* (2024.01)

(58) Field of Classification Search
CPC ...... G06F 3/0487; G06F 3/0202; G06F 3/016; G06F 3/04886; B60K 37/06; H01H 13/70; H01H 21/24; H01H 13/023; H03K 17/98; H03K 17/97; H05K 1/0284
See application file for complete search history.

(56) References Cited

U.S. PATENT DOCUMENTS

| | | | |
|---|---|---|---|
| 8,154,517 B2 | 4/2012 | Schwarz et al. | |
| 9,760,175 B2 | 9/2017 | Scheufler et al. | |
| 10,795,519 B2 | 10/2020 | Salandre et al. | |
| 11,416,081 B1* | 8/2022 | Sinivaara | H05K 1/0284 |

(Continued)

FOREIGN PATENT DOCUMENTS

| | | |
|---|---|---|
| DE | 3149222 | 6/1983 |
| DE | 19645675 | 5/1998 |

(Continued)

*Primary Examiner* — Richard J Hong
(74) *Attorney, Agent, or Firm* — Gerald E. Hespos; Michael J Porco (57) ABSTRACT

An operating interface (10) is in an interior of a vehicle and has a surface (11) that is visible in the interior. The operating interface (10) has an operating element (14) that can be shifted relative to the surface (11) between resting and operating positions. The operating element (14) has a display (17) that is inactive in the resting position and does not indicate a functional assignment of the operating element (14). However, the display (17) is active in the operating position and indicates a functional assignment of the operating element (14). The operating element (14) has a first orientation to the surface body (11) when in the operating position and has a second orientation to the surface body (11) when in the resting position. A gap (19) is formed between the operating element (14) and the surface body (11) and surrounds the operating element (14).

11 Claims, 6 Drawing Sheets

(56) References Cited

U.S. PATENT DOCUMENTS

| | | | | |
|---|---|---|---|---|
| 2004/0003986 | A1* | 1/2004 | Ito | H01H 13/70 200/6 R |
| 2005/0061645 | A1* | 3/2005 | Ishibashi | H01H 21/24 200/341 |
| 2009/0174673 | A1* | 7/2009 | Ciesla | G06F 3/016 345/173 |
| 2009/0322684 | A1* | 12/2009 | Schwarz | H01H 21/24 345/169 |
| 2015/0205416 | A1* | 7/2015 | Yairi | G06F 3/04886 345/173 |
| 2018/0269016 | A1* | 9/2018 | Gudimalla | H03K 17/97 |
| 2020/0136618 | A1 | 4/2020 | Lou et al. | |
| 2020/0214148 | A1* | 7/2020 | Teil | H03K 17/98 |

FOREIGN PATENT DOCUMENTS

| | | | |
|---|---|---|---|
| DE | 20205380 U1 * | 8/2003 | H01H 13/023 |
| DE | 102004033972 | 2/2006 | |
| DE | 102014215743 | 2/2016 | |
| DE | 102015008570 | 1/2017 | |

* cited by examiner

OPERATING INTERFACE OF A MOTOR VEHICLE HAVING A DISPLAY AND AN ACTUATOR AND MOTOR VEHICLE

CROSS-REFERENCE TO RELATED APPLICATION

This application claims priority on German Patent Application No. 10 2022 109 971.7 filed Apr. 26, 2022, the entire disclosure of which is incorporated herein by reference.

BACKGROUND

Field of the Invention. The invention relates to an operating interface of a motor vehicle and to a motor vehicle having an operating interface.

Related Art. Operating elements are installed in an interior of a motor vehicle and enable a driver to influence the function of assemblies of the vehicle, such as an air conditioning system, an entertainment system or a powertrain of the motor vehicle via the selection of travel programs.

A separate operating element often is provided for each function that can be influenced. Further, operating elements often are displayed via a touch screen that can change the displayed operating elements. For example, the touch screen can be changed to display only operating elements for influencing the air conditioning system or only operating elements for influencing an entertainment system.

U.S. Pat. No. 10,795,519 discloses a motor vehicle that has an operating interface with a panel extending continuously across a surface that is visible in an interior of the motor vehicle. The panel bears different symbols for different operating elements. The operating elements are positioned below the panel and can be shifted toward the surface of the panel so that protrusions deform portions of the panel that bear icons for the respective operating elements. Illuminating means can illuminate the symbols.

US 2020/0136618 A1 discloses an operating interface of a motor vehicle. The operating interface has an electronic display with touch screen operating elements as well as optical operating buttons.

U.S. Pat. No. 9,760,175 discloses an operating interface of a motor vehicle. The operating interface includes a pad with an array of operating elements that can be shifted individually relative to a base body for individually adjusting the height of the operating elements relative to the base body.

There is a need for an operating interface of a motor vehicle that easily is handled by a driver without distracting the driver from his or her actual driving task. There is also a need for a motor vehicle having such an operating interface.

SUMMARY

This disclosure relates to an operating interface with a body having a surface that is visible in the interior.

The operating interface also comprises at least one operating element that can be shifted translationally and/or rotationally relative to the body between a resting position and an operating position.

The operating element of the operating interface also comprises a display.

Each operating element that is in the resting position is inactive and is at a first orientation to the surface body. The display does not indicate a functional assignment of any operating element that is in the resting position. An inactive operating element is not available for selection or deselection of a respective function.

Each operating element that is in the operating position is active and is at a second orientation to the surface body. The display indicates a respective functional assignment of any operating element that is in the operating position. An active operating element is available for actuation, i.e. selection or deselection of a respective function.

A gap may be formed to surround each operating element at a position between the respective operating element and the surface body when the respective operating element is in at least one of the resting position and in the operating position.

The operating interface described herein allows a simple driver-side operation without distracting the driver from the actual driving task. Only when an operating element of the operating interface is active and in the operating position does the display show a functional assignment of the respective operating element. In this case, the respective operating element is shifted into its operating position where the operating element is the second orientation relative to the surface body. Thus, the operating element that is in the operating position can be perceived purely haptically by the driver. No surface material of the surface body extends over the operating element. Thus, the operating elements easily can be shifted relative to the surface body. This operating interface can be referred to as a morphing operating interface.

In some embodiments, the operating element comprises an at least partially transparent cover and a base body, and the display is arranged between the cover and the base body. The cover of each operating element defines a second region of the surface of the operating interface that is visible in the interior of the vehicle. The cover of each operating element that is inactive and in the resting position has the first orientation to the surface body. The cover of each operating element that is active and in the operating position has the second orientation to the surface body.

The operating interface of some embodiments comprises at least one actuator that shifts the respective operating element between the resting position and the operating position. Thus, each operating element of the operating interface can be shifted relative to the surface body via an individual actuator. The particular actuator can be a voice coil actuator, a Piezo actuator or the like. Such actuators can be integrated into a small space of the operating interface.

The operating interface of some embodiments comprises a control device that automatically triggers the respective actuator as a function of at least one operating condition of the motor vehicle to automatically shift the respective operating element between the resting position and the operating position and, as a function thereof, to automatically display a functional assignment via the display of the operating element. The shifting of the operating elements between the resting position and the operating position is carried out automatically via the control device as a function of the at least one operating condition of the motor vehicle. This also makes the operating interface easy for a driver to operate, namely without distracting the driver from a driving task.

In some embodiments, the cover is flush with the surface of the body when the respective operating element is in the resting position. However, the cover of the respective operating element is moved from the surface body when the respective operating element is in the operating position. Thus, the active and inactive operating elements can be discerned purely haptically by the driver. Any operating element that is active is moved out from the surface of the surface body and projects farther into the interior of the vehicle so that the active operating element can be perceived purely haptically by the driver without turning his or her eye away from the road.

The circumferential gap between the respective operating element and the surface body may be sealed by a sealing element. The sealing of the circumferential gap between the respective operating element and the surface body is preferable to avoid the penetration of contaminants into the operating interface via the gap.

The sealing element of some embodiments is a clasp arranged on a side of the surface body facing the surface of the operating interface between the cover of the operating element and the surface body in the region of the circumferential gap. The clasp has proven effective for sealing the gap. A surface material of the surface body can be folded and clamped over the clasp in the region of the gap without forming hems in the field of view. Close tolerances can be provided via the clasp.

Each clasp may be elevated against the surface of the surface body that is visible from the interior to enhance the purely haptic detection of an operating element.

The cover of the operating element may be flush with the surface of the clasp or may protrude relative to the clasp in the operating position of the respective operating element. The driver can purely haptically identify the operating element as inactive if the operating element that is surrounded by the clasp on the edge is offset in the direction of the surface body relative to the clasp that is elevated relative to the surface of the surface body. On the other hand, the driver can purely haptically identify the cover of the operating element as active if the cover of the respective operating element is flush with the surface of the respective clasp or protrudes relative to the clasp. For this purpose, the driver does not have to turn his or her eye away from the road and is not distracted.

The operating interface of some embodiments comprises a support body extending on a side of the surface body facing away from the surface of the operating interface that is visible in the interior at a distance from the surface body. In this embodiment, the support body forms at least one stop for the base body of the respective operating element in the resting position of the operating element, and the surface body forms at least one stop for the base body of the respective operating element in the operating position of the operating element. Thus, a defined relative position between the operating element and the surface body can be ensured simply by these stops in both the resting position and the operating position.

Embodiments of the invention will be explained in greater detail with reference to the drawings, without being restricted thereto.

DETAILED DESCRIPTION

Figure 1:
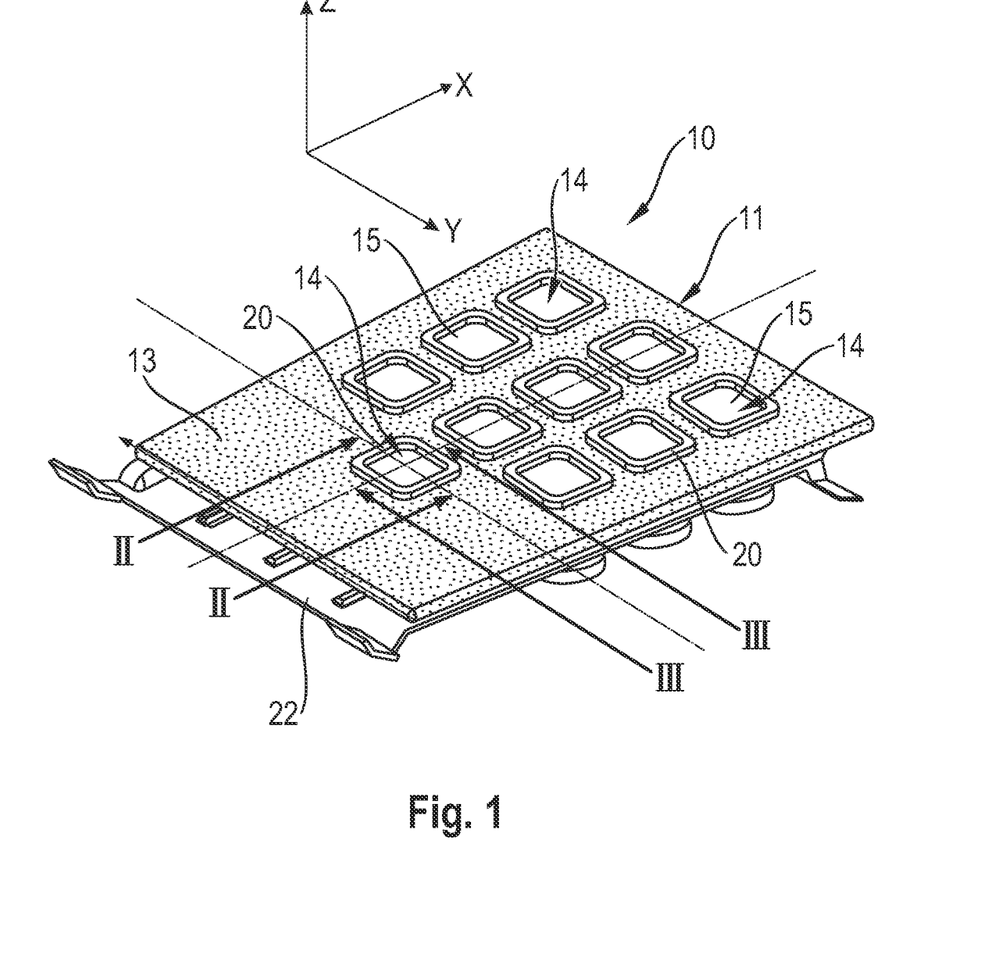
FIG. 1 is a top perspective view of an operating interface of a motor vehicle.

FIG. 1 is a top perspective view of an operating interface 10 of a motor vehicle and can be referred to as a motor vehicle operating interface. The operating interface 10 is arranged in an interior of the motor vehicle and may be installed in a center console of the motor vehicle. The X-direction of FIG. 1 corresponds to the vehicle longitudinal direction, the Y-direction to the vehicle lateral direction, and the Z-direction to the vehicle vertical direction.

The operating interface 10 has a surface body 11 that forms a first region of a surface of the operating interface 10 that is visible in the interior of the motor vehicle. As can be seen in the cross-sections of FIGS. 2 to 4, the surface body 11 has a material carrier 12 that supports a surface material 13. The surface material 13 can be, for example, leather, wood, or carbon. The material carrier 12 can be made of plastic.

The operating interface 10 has at least one operating element 14, and a total of ten operating elements 14 are shown in FIG. 1. The operating elements 14 of this embodiment form an array with rows and columns. The operating elements 14 are covered by the surface material 13 and thus are not covered by the surface body 11.

Each operating element 14 is individually shiftable translationally and/or rotationally relative to the surface body 11 between a resting position and an operating position.

Figure 2:
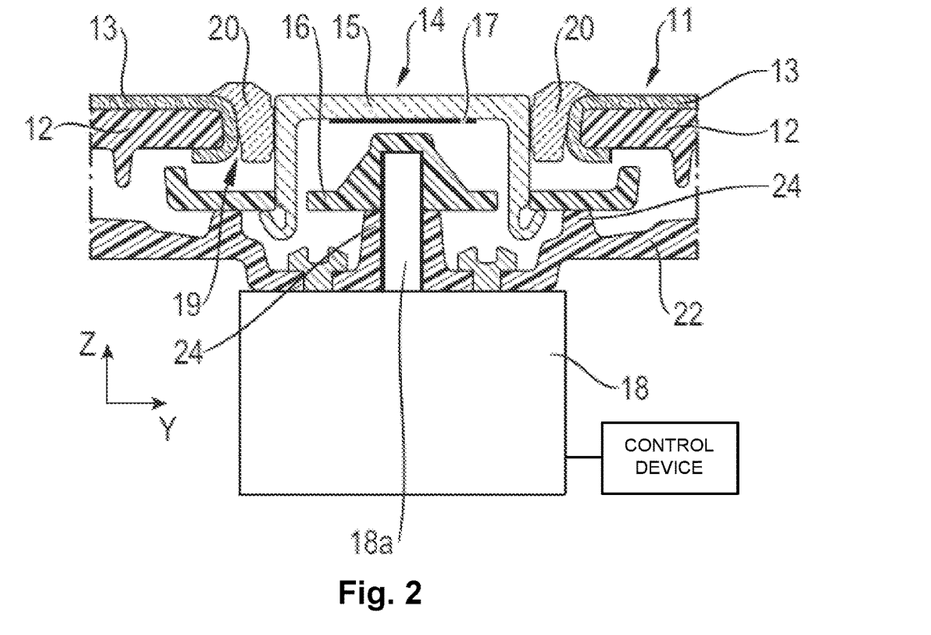
FIG. 2 is a cross-section taken along line II-II of FIG. 1.
Figure 3:
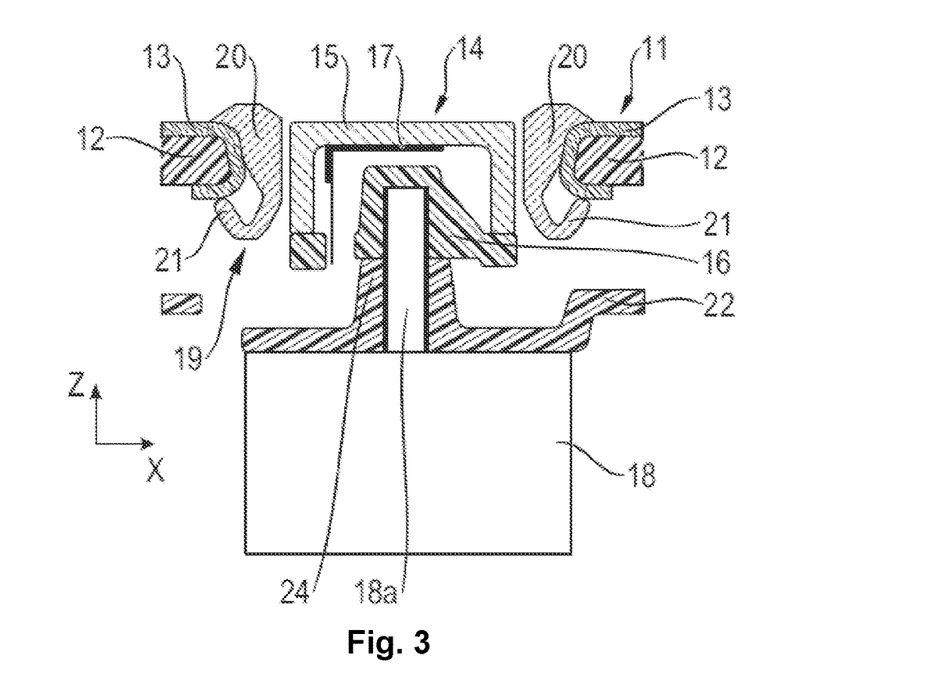
FIG. 3 is a cross-section taken along line III-III of FIG. 1.
Figure 4:
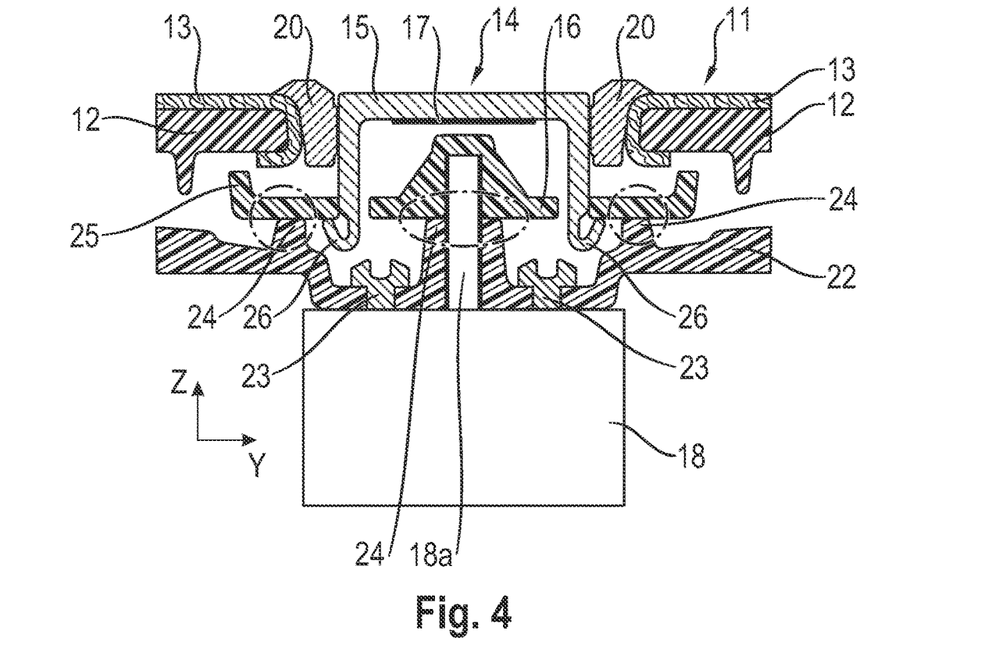
FIG. 4 is a cross-section of FIG. 2 in the resting position of the operating element.
Figure 5:
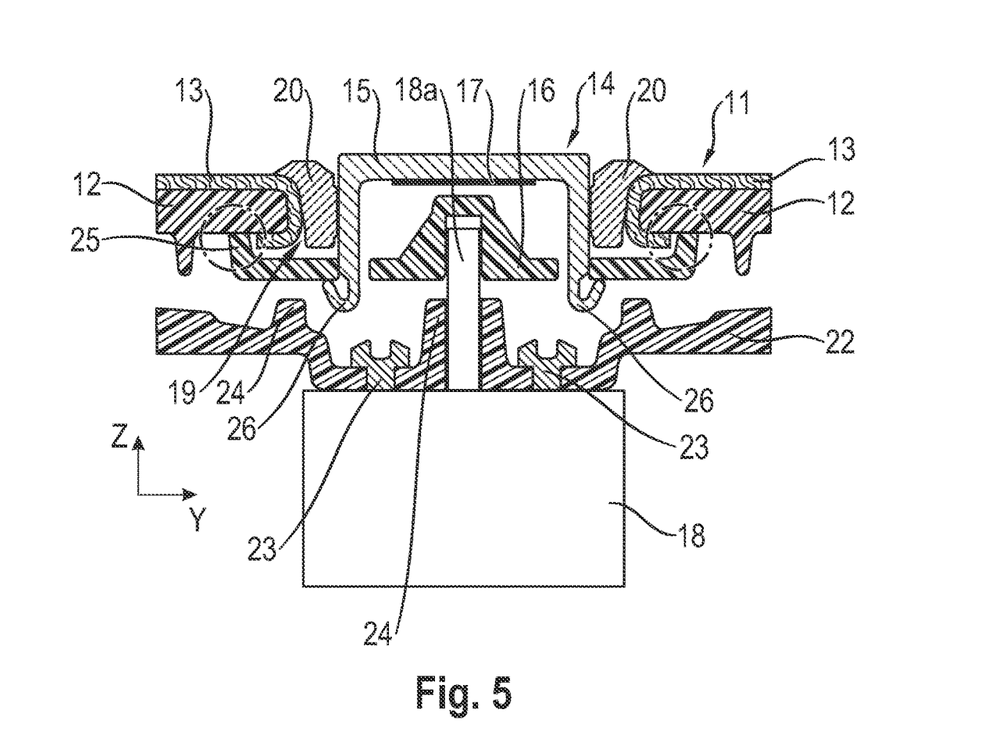
FIG. 5 is a cross-section of FIG. 2 in the operating position of the control.

FIGS. 2, 3, and 4 show the operating element 14 in the resting position, and FIG. 5 shows the operating element 14 in the operating position.

Each operating element 14 has an at least partially transparent cover 15, a base body 16, and a display 17 between the cover 14 and the base body 16. The cover 15 is transparent at least in sections where the display 17 has a display region.

An actuator 18 is associated with each operating element 14, and enables the respective operating element 14 to be transferred between the resting position and the operating position. The actuator 18 can be, for example, a voice coil actuator, a Piezo actuator, or the like.

The cover 15 of each operating element 14 forms a second region of the surface of the operating interface 10 that is visible in the interior of the vehicle. The exemplary embodiment of FIG. 1 has ten operating elements 14 that define ten such second regions of the visible surface of the operating interface 10.

The cover 15 of each operating element 14 that is inactive and in the resting position has a first orientation to the surface body 11 of the operating interface 10. The cover 15 of each operating element 14 that is active and in the operating position has a second orientation to the surface body 11 of the operating interface 10.

The transfer of the each operating element 14 between the resting and operating positions is carried out by translational and/or rotational shifting of the operating element 14 relative to the surface body 11. In the embodiment of FIGS. 1 to 5, the respective operating element 14 can be shifted translationally towards or away from the surface body 11 via the actuator 18 of the respective operating element 14.

The display 17 of each operating element 14 that is inactive and in the resting position does not indicate a functional assignment of the respective operating element 14. By contrast, the display 17 of each operating element 14 that is active and in the operating position shows a functional assignment of the respective operating element 14, and that functional assignment is visible through the transparent cover 15.

A gap 19 surrounds each operating element 14 at positions between the operating element 14 and the surface body 11 in both the resting position and the operating position of the respective operating element 14.

This gap 19 between each operating element 14 and the surface body 11 is sealed via a sealing element 20 that is configured as a clasp in the embodiment of FIGS. 1 to 5. The sealing element 20 extends over the entire gap 19, i.e. circumferentially around the edge of the respective operating element 14.

The cover 15 of each operating element 14 that is in the operating position is flush with the surface of the surface material 13 of surface body 11, as shown in FIGS. 2, 3, and 4. In the operating position, the cover 15 of the respective operating element 14 is moved out from the surface of the surface body 11 (see FIG. 5). Thus, a surface of the cover 15 of the respective operating element 14 protrudes out relative to the surface material 13 of the surface body 11, i.e., stronger or farther into the interior of the vehicle.

In the embodiment of FIGS. 1 to 5, each sealing element 20 is configured as a clasp for sealing the gap 19 between the respective operating element 14 and the surface body 11. This clasp is designed to be elevated relative to the surface of the surface body 11, i.e., relative to the surface material 13 thereof, so that the region of each operating element 14 easily can be perceived haptically.

The clasp 20 protrudes from the surface of the cover 15 of the respective operating element 14 when the operating element 14 framed by the clasp 20 is inactive. Thus, the inactive operating element 14 easily can be perceived haptically. By contrast, the cover 15 of an active operating element 14 is either flush with the surface of the respective clasp 20 or protrudes from the clasp 20 (see FIG. 5), so that the active operating element 14 easily can be perceived haptically.

The sealing element 20 shown in FIGS. 1 to 5 is a clasp 20 that is inserted into the circumferential gap around the respective operating element 14 and is clipped with the surface body 11 (see FIG. 3).

Corresponding clip elements 21 of the sealing element 20 clamp an edge of the surface material 13 folded around the material carrier 12 of the surface body 11 and ensure that no hems of the surface material 13 are formed in the visible region.

The sealing element 20 can be made of a light-conducting material in FIGS. 1 to 5, for example a light-conducting plastic. Thus, when the respective operating element 14 is active, the clasp 20 can also conduct light to provide an additionally visual indication that the respective operating element 14 is active and available for actuation, i.e., is assigned a corresponding function.

The operating element 14 comprises the cover 15, the base body 16, and the display 17 that is arranged between the cover 15 and the base body 16. The display 17 is mounted on an inner side of the cover 15 in FIGS. 1 to 5, in particular by optical bonding or gluing, and preferably as an OLED display.

FIGS. 1 to 5 show a support body 22 arranged on the surface of the body 11 facing away from the operating interface 10, at a distance from the body 11. As shown in FIGS. 2, 4, and 5, the respective actuator 18 of the respective operating element 14 is connected to the support body 22 via screws 23.

The actuator 18 has an actuating element 18a that extends through the support body 22 and couples the actuator 18 to the respective operating element 14 to transfer the operating element 14 between the resting position and the operating position.

As shown in FIGS. 4 and 5, the support body 22 has protrusions 24 that form a stop for the base body 16 of the operating element 14 in the resting position of the respective operating element 14.

The material carrier 12 of the surface body 11 is configured to stop the respective operating element 14 in the operating position. More particularly, the base body 16 of the operating element 14 has protrusions 25 that contact an inner side of the material carrier 12 of the surface body 11 of the operating element 14, as shown in FIG. 5, to prevent the operating member 14 from protruding out beyond the operating position.

As noted above, the sealing elements 20 are configured as clasps that connect to the surface body 11 by clipping. FIGS. 2, 4, and 5 show that the cover 15 of a respective operating element 14 also is connected to the base body 16 of the respective operating element 14 by clipping. In this regard, the cover body 15 has clip elements 26 that extend through recesses in the respective base body 16 of the respective operating element 14 and drive the base body 16 while forming the clip connection.

The operating interface 10 further comprises a control device that automatically triggers the actuator 18 of the respective operating element 14 as a function of at least one operating condition of the motor vehicle. The actuator 18 then shifts the respective operating element 14 automatically between the resting position and the operating position and thereby automatically displays a functional assignment via the display 17 of the respective operating element 14 in the operating position. The control device may comprise a processor adapted to process input data of at least one sensor that receives input relating to at least one operating condition of the motor vehicle. The control device shown schematically in the FIG. 2 may be implemented in various forms of hardware, software or combinations thereof. It will be appreciated by those skilled in the art that the block diagram presented in FIG. 2 represents conceptual views of illustrative components embodying the principles of the disclosure. Preferably, these elements are implemented in a combination of hardware and software on one or more appropriately programmed general-purpose devices that may include a processor, memory and input/output interfaces.

Figure 6:
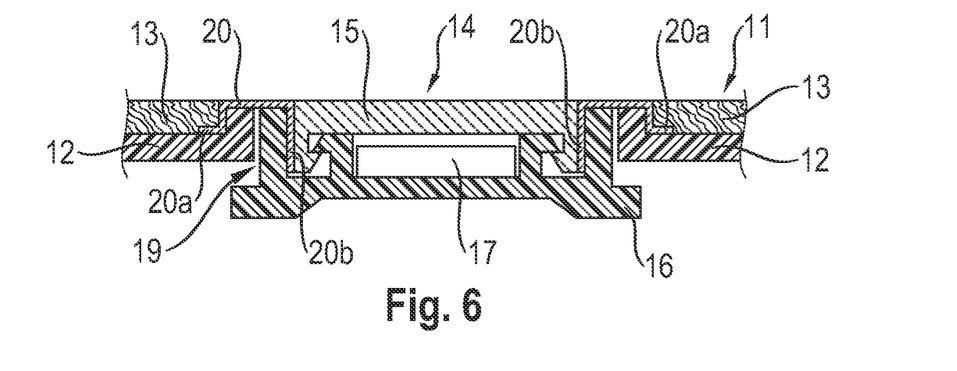
FIG. 6 is a cross-section through a first alternate embodiment.
Figure 7:
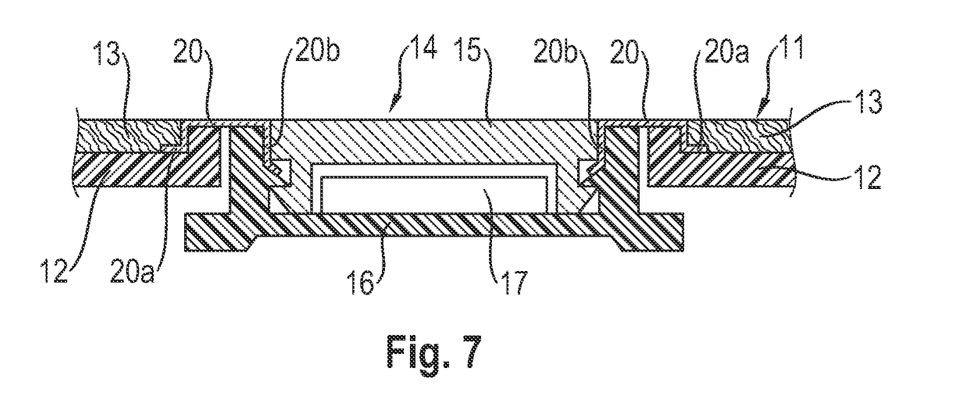
FIG. 7 is a cross-section through a second alternate embodiment.
Figure 8:
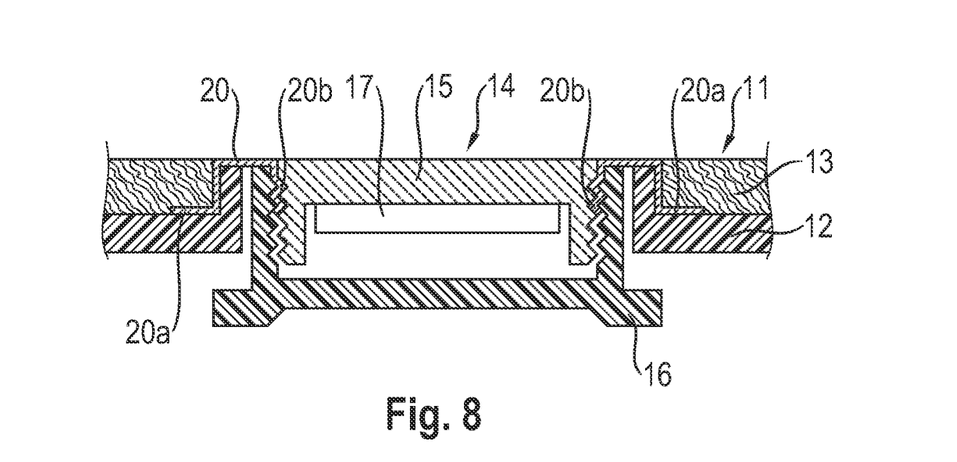
FIG. 8 is a cross-section through a third alternate embodiment.

FIGS. 6 to 8 show a first variation of the operating interface 10 that differs from FIGS. 1 to 5 in terms of sealing the circumferential gap 19 between the operating element 14 and the surface body 11. The sealing element 20 in FIGS. 6-8 is a foil that covers the circumferential gap 19 between the operating element 14 and the surface body 11 at the visible surface of the operating interface 10. The foil-like sealing element 20 is clamped with a first edge portion 20a clamped between the material carrier 12 and the surface material 13 of the surface body 11 and a second edge portion 20b clamped between the cover 15 and the base body 16 of the respective operating element 14. The sealing element 20 is deformed elastically when the respective operating element 14 is moved relative to the surface body 11.

The cover 15 of the operating element 14 of FIG. 6 is clipped to the base body 16 thereof, and the sealing element 20 is clamped and glued at its ends 20a, 20b. The display 17 of FIG. 6 is received by the base body 16.

FIG. 7 differs from FIG. 6 only in the configuration of the positively locking connection between the cover 15 and the base body 16 of the respective operating element 14. In FIG. 6, the latching connection between the cover 15 and the base body 16 is arranged separately from the clamping and adhesive connection for the end 20b of the sealing element 20. However, these two connections are integrated in FIG. 7. The positively locking connection between the cover 15 and the base body 16 of the operating element 14 also serves to attach the section 20b of the sealing element 20 to the respective operating element 14.

FIG. 8 differs from FIG. 7 by providing a plurality of positively engaging protrusions and recesses on the cover 15 and on the base body 16 of the operating element 14. The FIG. 8 embodiment improves the positively locking connection for the end 20b of the sealing element 20 and avoids a need for an adhesion to the section 20b of the sealing element 20. In this case, the adhesion takes place in addition to the clamping on section 20a of the respective sealing element 20 between the material carrier 12 and surface material 13 of the surface body 11.

FIGS. 9a, 9b, 9c, 9d, and 9e are schematic views of further variations in the region of an operating element 14 together with a section of the surface body 11. The left sides of FIGS. 9a to 9e show the operating elements 14 in the resting position and the right sides show the operating elements 14 in the operating position.

Figure 9A:
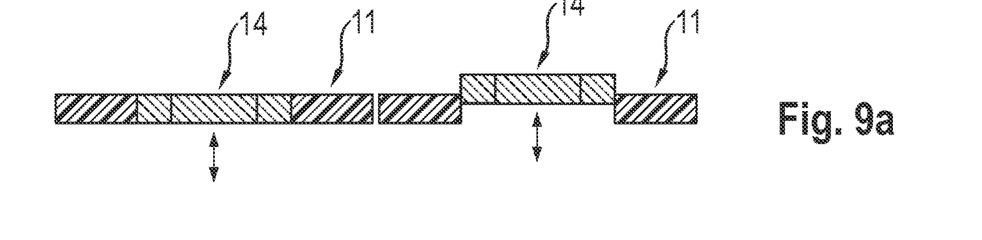
FIGS. 9a-9e are schematic cross-sections through further alternate embodiments.
Figure 9B:
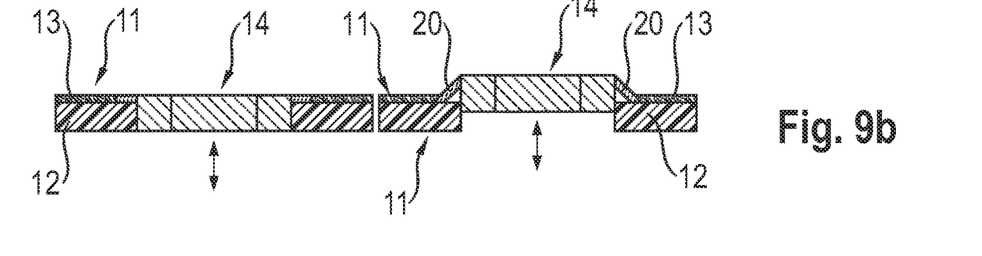

In FIGS. 9a to 9e, the operating element 14 can be shifted translationally relative to the surface body 11 between the resting position on the left side and the operating position on the right side. FIG. 9a visualizes only the translational shifting of the operating element 14 relative to the surface body 11 analogous to the embodiments of FIGS. 1 to 8. FIG. 9b also shows the deformation of the sealing element 20 when the operating element 14 is transferred into the operating position analogous to FIGS. 6 to 8.

Figure 9C:
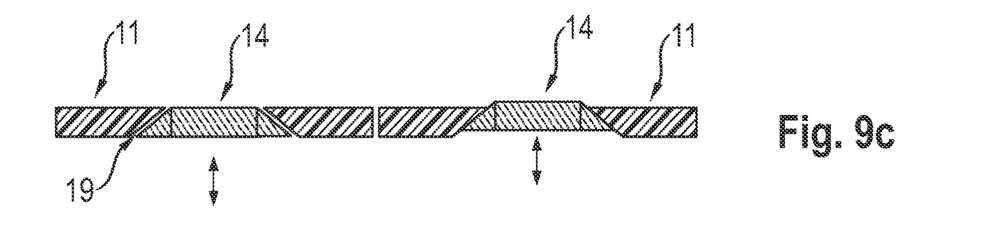

In FIG. 9c, the gap 19 between the operating element 14 and the surface body 11 is open in the resting position of the respective operating element 14. This gap 19 is closed when the operating element 14 is transferred into the operating position due to the trapezoidal contouring of the operating element 14.

Figure 9D:
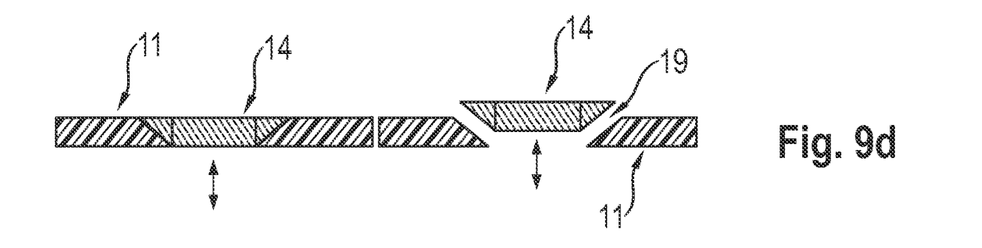
Figure 9E:
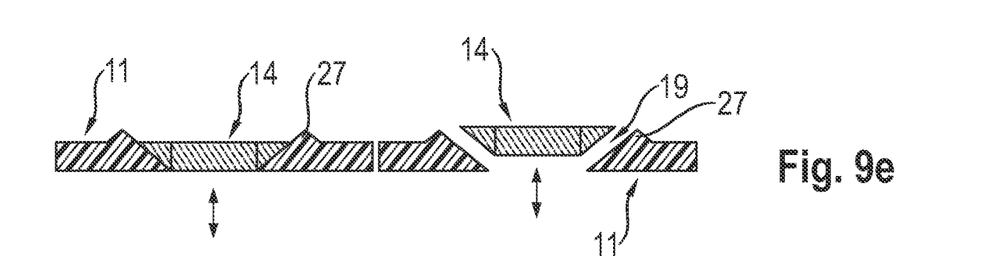

In FIG. 9d, this operating principle of the trapezoidal operating element 14 is reversed. The gap 19 between the operating element 14 and the surface body 11 of FIG. 9d is open in the operating position, but is closed in the resting position. FIG. 9e shows a variation where the surface body 11 comprises protrusions 27. Sealing elements 20 that are configured as clasps in FIGS. 1 to 5, are elevated relative to the surface of the surface body 11 and thus provide a haptic surface structure that supports or facilitates the purely haptic perception of an operating element 14.

Figure 10A:
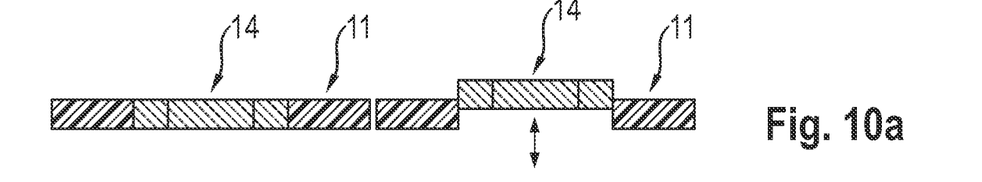
FIGS. 10a-10c are schematic cross-sections through further alternate embodiments.
Figure 10B:
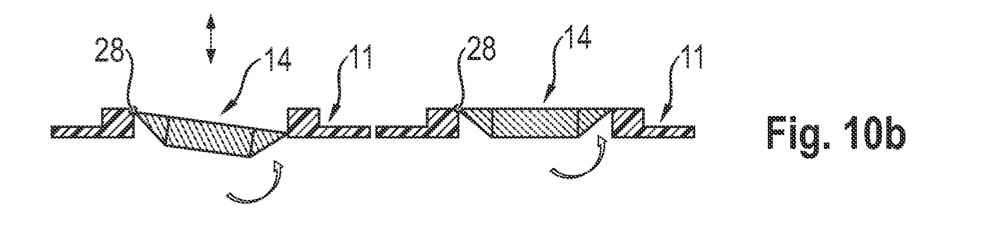
Figure 10C:
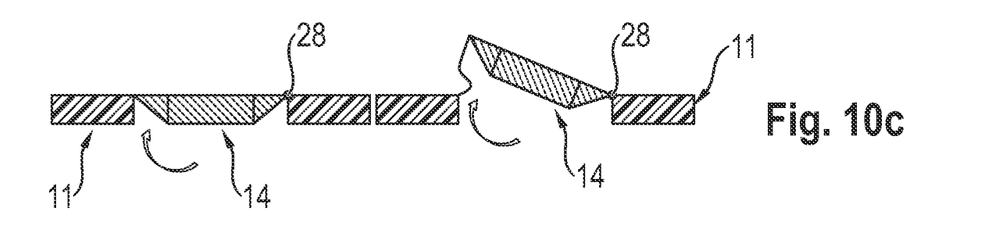

In all embodiments of FIGS. 1 to 9e utilize a translational shifting of the operating element 14 relative to the surface body 11. FIGS. 10a, 10b, and 10c show different shifting options of the operating element 14 relative to the surface body 11. FIG. 10a corresponds to FIG. 9a and shows a translational shifting of the operating element 14 relative to the surface body 11 when shifting the respective operating element 14 between the resting position and the operating position.

By contrast, FIGS. 10b and 10c show options for shifting the operating elements 14 relative to the surface body 11. More particularly, FIG. 10b shows a rotational elevation of the operating element 14 from a downwardly inclined resting position into a horizontal operating position. In the resting position shown on the left side of FIG. 10b, the operating element 14 is inclined obliquely downwards, while the operating element 14 is aligned horizontally in the actuation position on the right side of FIG. 10b. The rotation or rotational shifting of the operating element 14 relative to the surface body 11 takes place about an axis 28 extending in the Y direction.

FIG. 10c also shows a rotation or rotational shifting of the operating element 14 relative to the surface body 11 about an axis 28 extending in the Y direction. FIG. 10c differs from FIG. 10b in that the operating element 14 of FIG. 10c is horizontal and flush with the surface of the surface body 11 in the resting position shown on the left side and, in the operating position on the right side of FIG. 10c, and is elevated out of the surface body 11 by an overly twisted rotational movement about the axis 28.

Figure 11A:
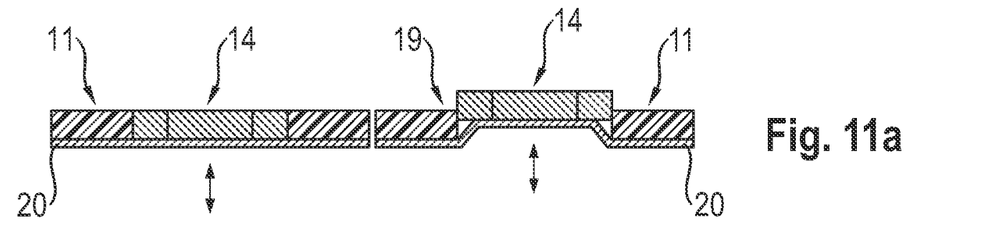
FIGS. 11a-11b are schematic cross-sections through further alternative embodiments.
Figure 11B:
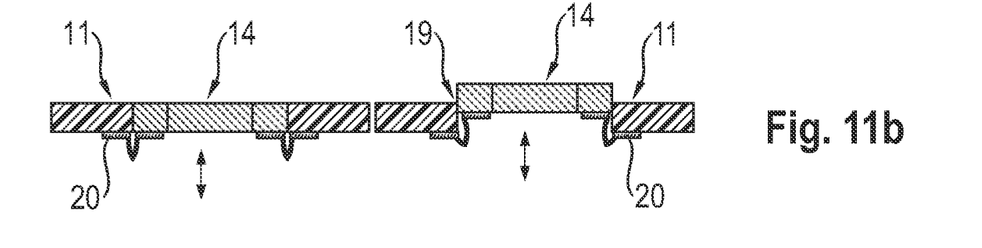

FIGS. 11a and 11b show further variations of the operating interface 10. While FIGS. 1 to 5 show the sealing element 20 configured as a clasp for sealing the gap 19 between the operating element 14 and the surface body 11 and FIGS. 6, 7, 8, 9b show embodiments where the sealing element 20 is visible from the interior of the vehicle and covers the gap 19 between the sealing element 14 and the surface body 11 on the outside of the surface of the operating interface 10. However, FIGS. 11a and 11b show embodiments where a sealing element 20 for sealing the gap 19 between the operating element 14 and the surface body 11 is not visibly installed.

Thus, in FIGS. 11a and 11b, the sealing element 20 for sealing the gap 19 between the operating element 14 and the surface body 11 is arranged on a side of the surface body 11 facing away from the surface of the surface body 11 of the operating interface 10 and thus the operating element 14. In FIG. 11a a foil-like sealing element 20 extends continuously along the underside of the respective operating element 14 and adjacent portions of the surface body 11 on the side of the surface body 11 and the operating element 14 facing away from the surface of the operating interface 10. In FIG. 11b the sealing elements 20 are arranged exclusively in the region of the gap 19.

The sealing elements 20 in FIGS. 11a, 11b are elastically deformable, as in FIGS. 6-8 and 9b, and deform elastically when transferring the operating element 14 from the resting position shown on the left side into the operating position shown on the right side.

The invention claimed is:

1. An operating interface (10) arranged or installed in an interior of a motor vehicle, the operating interface comprising:
   a surface body (11) defining at least a first part of a surface of the operating interface (10) that is visible in the interior of the motor vehicle;
   at least one operating element (14) that includes a display (17), the at least one operating element (14) being shiftable relative to the surface body (11) between a resting position where the at least one operating element (14) has a first orientation to the surface body (11) and an operating position where the at least one operating element (14) has a second orientation to the surface body (11), the at least one operating element (14) that is in the resting position being inactive and not indicating a functional assignment of the at least one operating element (14), and the at least one operating element (14) that is in the operating position being active and indicating a functional assignment of the at least one operating element (14);

a circumferential gap (19) being formed between the at least one operating element (14) and the surface body (11) and surrounding the at least one operating element (14) when the at least one operating element (14) is in at least one of the resting position and the operating position; and a sealing element (20) that extends circumferentially around the at least one operating element (14) and seals the circumferential gap (19) between the at least one operating element (14) and the surface body (11), an outer part of the sealing element (20) extending outward beyond the circumferential gap (19) and onto a part of the surface body (11) that is visible in the interior of the motor vehicle.

2. The operating interface (10) of claim 1, wherein the at least one operating element (14) further comprises a cover (15) and a base body (16), the cover (15) being at least partially transparent and the display (17) being arranged between the cover (15) and the base body (16), the cover (15) of the at least one operating element (14) defining a second part of the surface of the operating interface (10) that is visible in the interior, the cover (15) being in the first orientation to the surface body (11) when the at least one operating element (14) is the resting position, and the cover (15) being in the second orientation to the surface body (11) when the at least one operating element (14) is in the operating position.

3. The operating interface of claim 2, wherein the cover (15) is flush to the surface of the surface body (11) when the at least one operating element (14) is in the resting position and the cover (15) is displaced from the surface body (11) when the at least one operating element (14) is in the operating position.

4. The operating interface of claim 2, wherein the cover (15) is clipped to the base body (16) of the at least one operating element (14).

5. The operating interface of claim 1, wherein the sealing element (20) is a foil that extends on a side of the surface body (11) facing away from the surface of the operating interface that is visible in the interior at least in a region of the circumferential gap (19).

6. The operating interface of claim 1, wherein the sealing element (20) is a foil that extends on the surface of the operating interface (10) that is visible in the interior between the cover (15) of the at least one operating element (14) and the surface body (11) at least in a region of the circumferential gap (19).

7. The operating interface of claim 1, wherein the sealing element (20) is clipped to the surface body (11).

8. The operating interface of claim 1, further comprising at least one actuator (18) that shifts the at least one operating element (14) between the resting position and the operating position.

9. The operating interface of claim 8, further comprising a control device that triggers the at least one actuator (18) as a function of at least one operating condition of the motor vehicle to automatically shift the at least one operating element (14) between the resting position and the operating position and, as a function thereof, to automatically display a functional assignment via the display (17) of the at least one operating element (14).

10. A motor vehicle comprising an interior and the operating interface (10) of claim 1 installed in the interior.

11. An operating interface arranged or installed in an interior of a motor vehicle, the operating interface comprising:

a surface body (11) defining at least a first part of a surface of the operating interface (10) that is visible in the interior of the motor vehicle;

at least one operating element (14) that includes a display (17), the at least one operating element (14) being shiftable relative to the surface body (11) between a resting position where the at least one operating element (14) has a first orientation to the surface body (11) and an operating position where the at least one operating element (14) has a second orientation to the surface body (11), the at least one operating element (14) that is in the resting position being inactive and not indicating a functional assignment of the at least one operating element (14), and the at least one operating element (14) that is in the operating position being active and indicating a functional assignment of the at least one operating element (14);

a gap (19) being formed between the at least one operating element (14) and the surface body (11) and surrounding the at least one operating element (14) when the at least one operating element (14) is in at least one of the resting position and in the operating position; and a support body (22) on a side of the surface body (11) facing away from the surface of the operating interface (11) that is visible in the interior and being spaced from the surface body (11), the support body (22) forming at least one stop for the base body (16) of the at least one operating element (14) in the resting position of the at least one operating element (14), and the surface body (11) forming at least one stop for the base body (16) of the at least one operating element (14) in the operating position of the at least one operating element (14).

\* \* \* \* \*